United States Patent Office 3,418,890
Patented Dec. 31, 1968

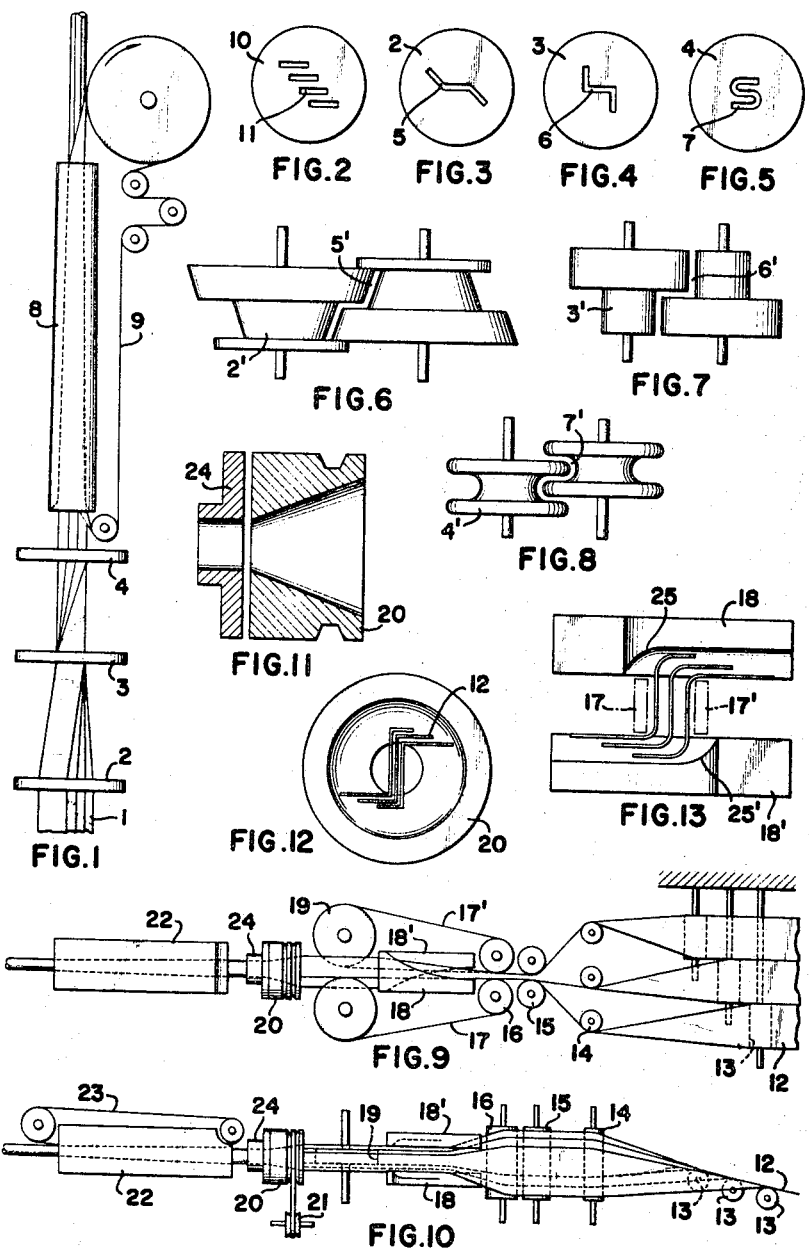

3,418,890
METHOD OF MANUFACTURING CYLINDRICAL FILTER PIECES OF FILTER SHEETS
Sachihiko Tachibana, Hajime Umedo, and Susumu Nagai, Tokyo, and Hiroshi Orito, Chiba-ken, Japan, assignors to Honshu Seishi Kabushiki Kaisha, Tokyo, Japan, a corporation of Japan
Filed May 27, 1966, Ser. No. 553,552
Claims priority, application Japan, June 1, 1965, 40/32,034; Apr. 16, 1966, 41/23,801
10 Claims. (Cl. 93—1)

ABSTRACT OF THE DISCLOSURE

A method of manufacturing a filter by laminating at least two filter sheets of indefinite length by juxtaposing their longitudinal edges to overlap each other a predetermined amount, folding the resulting laminate gradually so as to ultimately form an S or Z shape, and compressing the shaped laminate.

This invention relates to a method for adequately and efficiently manufacturing cylindrical filters, especially cigarette filters from filter sheets.

For the manufacture of cylindrical filter pieces from filter sheets, it has been proposed to form a core beforehand and wrap it with filter sheet helically wound therearound or to roll a filter sheet twistingly as in making a twisted paper string.

These methods are invariably troublesome and tend to form steps on the periphery of product which in turn provide resistance to the flow of air or gas through the filter, or fail to produce cylinders of true roundness or uniform circumference. Thus, none of them can provide satisfactory cylindrical filters. Further, in the manufacture of cylindrical filters, care must be used not to wind up the filter sheet excessively because it would deprive the product of gas permeability. In addition, the filter sheet usually tends to be creased in the course of winding and the creases provide large spaces in the region of spirally wound sheet, with the result that gas permeation is concentrated in the region, whereby the filter produced loses its value as such.

As stated above, many difficulties are involved in the manufacture of cylindrical filters from filter sheet. The present invention has overcome these difficulties and has solved problems in the manufacture of cylindrical filters by providing a method which comprises arranging sidewise a suitable number greater than two of filter sheets with a certain overlap between each pair of adjacent sheets, folding the overlapped sheets into a generally zigzag shaped cross-section (S shaped or Z shaped form), and thereafter either winding up the form with compressive force, or twisting the component sheets of the form together by a rotating rotor which has a tapered bore and then winding up the form with compressive force.

The present invention will be more fully described hereunder with reference to the accompanying drawings, in which:

FIG. 1 is a plan view of an arrangement embodying the invention;

FIG. 2 is a front view of a guide for arranging a plurality of filter sheets side by side with a certain overlap between each pair or adjacent sheets;

FIGS. 3 to 5 are front views of folding guides for folding filter sheets into an S-shaped or Z-shaped form;

FIGS. 6 to 8 are front views of folding rolls in another form embodying the invention for folding filter sheets into an S-shaped or Z-shaped form;

FIG. 9 is a plan view of a second arrangement embodying the invention;

FIG. 10 is a schematic side view of the arrangement shown in FIG. 9, stripped of the part of the second arrangement embodying of FIG. 9;

FIG. 11 is a sectional view of a compression rotor;

FIG. 12 is a front view illustrating operation of the rotor shown in FIG. 11; and FIG. 13 is a front view of a guide plate assembly.

Referring now to a first embodiment of the invention shown in FIGS. 1 through 8, two or more filter sheets 1, for example of non-woven cloth or low-density paper, in the form of strips are arranged sidewise with a certain overlap between each pair of adjacent sheets according to the intended size of cylinder. The sheets are thus arranged in such manner as to preclude formation of steps upon winding. Without the sidewise overlaps, the sheets will be wound up to a stepped and unsmooth cylinder. For this reason, the widthwise overlap should be so chosen that the sides of wound sheets can provide a smooth cylindrical surface.

In order to arrange filter sheets 1 side by side with a certain overlap between each pair of adjacent strips, a guide 10 as shown in FIG. 2 may be conveniently employed. The guide 10 is formed of a flat, circular plate provided with guide slits 11 regularly spaced from one another in overlapped relations like steps, each slip permitting passage of a single strip of sheet 1 therethrough. When threaded through the guide slits 11 of the guide, the sheets 1 can be automatically arranged sidewise with certain overlaps.

Next, the overlapped sheets are folded into a S-shaped or Z-shaped form. This is suitably accomplished by passing the overlapped sheets in succession through the folding guides 2, 3 and 4 as shown, respectively, in FIGS. 3, 4, and 5, or through the folding rolls 2', 3', and 4' as shown, respectively, in FIGS. 6, 7 and 8. The folding guides 2, 3, and 4 are made of flat circular plates provided with guide slits 5, 6 and 7, respectively, thereby to fold the overlapped sheets gradually into a S-shaped or Z-shaped form. Likewise, the folding rolls 2', 3' and 4' are so arranged that their engaging portions 5', 6' and 7', respectively, can gradually fold the overlapped sheets into a S-shaped or Z-shaped form. By being threaded through the series of folding guides 2, 3 and 4, or through the series of folding rolls 2', 3' and 4', the filter sheets 1 can be automatically folded in succession into a S-shaped or Z-shaped form.

Next, the overlapped form of sheets is compressed windingly to a cylinder, as it is passed through a pipe 8 having a tapered bore. In order that the filter sheets may proceed smoothly through the pipe 8, an endless belt 9 is driven through the pipe 8. Thus, the filter sheets 1 are compressed and wound up while being carried on the belt through the pipe.

As described hereinbefore, the filter sheets 1 laminated sidewise with certain overlaps are compressed up to such a state that their ends and sides are arranged like petals of flowers, thereby providing a smooth, stepless cylindrical surface. Since the filter sheets 1 are folded beforehand into a S-shaped or Z-shaped form, the resulting cylindrical filter will have no creases or flares inside, and is compressed uniformly throughout.

In another embodiment of the invention illustrated in FIGS. 9 through 13, filter sheets 12, for example three such sheets are arranged side to side respectively on three horizontal shaft rolls 13 of different and gradient heights. The sheets are twisted at a right angle by vertical shaft rolls 14, and are then overlapped by rolls 15.

Subsequently, the sheets 12 laminated with certain overlaps are folded into an S-shaped or Z-shaped form. For this purpose, the overlapped laminate is gripped between and carried by a pair of endless belts 17, 17', when it is folded into a S-shaped or Z-shaped form by curved guides 25, 25' of guide plates 18, 18', respectively, which define a S-shaped or Z-shaped clearance therebetween. In the figures, reference numerals 16 and 19 indicate pulleys for the endless belts 17.

The laminate of sheets 12 folded into a S-shaped or Z-shaped form is twisted gradually from the tip as shown in FIG. 12 by means of a rotor 20 having a tapered bore which is revolved by a pulley 21 with respect to the pulleys 19 and a stationary guide pipe 24. Thus, the sheets are twisted together in a crease-proof manner to form a perfect cylindrical form.

The twisted sheets are then carried by an endless feed belt 23 through a pipe 22 which has a tapered inside diameter. In this way, the sheets are compressed together to a cylindrical form of a desired diameter.

In the second embodiment of the invention, more than two filter sheets are laminated with certain overlaps and are folded altogether into a S-shaped or Z-shaped form simply by an arrangement different from the one employed in the first embodiment of the invention. However, it is an important feature which distinguishes the second embodiment from the former that the overlapped sheets folded into a S-shaped or Z-shaped form are twisted at both sides in the direction of rotation of a rotor 20 having a tapered bore before the S-shaped or Z-shaped laminate of sheets is compressed, for example through the pipe 8 in the first embodiment of the invention.

Ordinarily if the running sheets have an increased density or are somewhat thickened with a consequent increase in the amount to be compressed, they tend to have creases. Such possibility is eliminated by passing the laminate through a rotor 20 having a tapered bore as in the second embodiment of the invention. Even if the amount to be compressed is increased, the sheets will be twisted together without creasing because the sheet edges are arranged orderly by the rotation of the rotor 20 with respect to the pulleys 19 and stationary guide pipe 24, whereby a creaseless and finely looking cylindrical filter is obtained.

What is claimed is:

1. A high speed, continuous method of maunfacturing a filter comprising the steps of laminating at least two filter sheets of indefinite length by juxtaposing their longitudinal edges to overlap each other a predetermined amount, folding the resulting laminate gradually so as to ultimately form a zig-zag cross-sectional shape, compressing said shaped laminate gradually to form a uniformly dense and crease-proof cylindrical filter having a true round cross-sectional shape.

2. The method according to claim 1 wherein said compressing step is carried out by moving said shaped laminate through a long annular shaped funnel having a gradually tapered internal bore.

3. The method according to claim 2 wherein said laminate is carried by an endless moving belt.

4. The method according to claim 2 wherein said folding step is carried out by gripping said laminate between a pair of endless belts and folding said laminate into an S-shaped form.

5. The method according to claim 2 wherein said folding step is carried out by gripping said laminate between a pair of endless belts and folding said laminate into a Z-shaped form.

6. The method according to claim 4 wherein said shaped laminate is twisted prior to said compresssing step by means of a rotating sleeve having a tapered bore.

7. The method according to claim 5 wherein said shaped laminate is twisted prior to said compressing step by means of a rotating sleeve having a tapered bore.

8. The method of claim 2 wherein said filter sheets are selected from the group consisting of non-woven cloth or paper.

9. The method of claim 2 wherein said filter sheets are non-woven cloth having a low tensile strength.

10. The method of claim 2 wherein said filter sheets are paper having low density.

References Cited

UNITED STATES PATENTS 2,023,766   12/1935   May.
2,164,702   7/1939   Davidson.

BERNARD STICKNEY, *Primary Examiner.*